United States Patent [19]
Appel et al.

[11] 3,950,498
[45] Apr. 13, 1976

[54] PROCESS FOR THE PRODUCTION OF SULFUR TETRAFLUORIDE
[75] Inventors: Rolf Appel; Ahmad Gilak, both of Bonn, Germany
[73] Assignee: Rolf Appel, Bonn, Germany
[22] Filed: Dec. 10, 1974
[21] Appl. No.: 531,411

[30] Foreign Application Priority Data
Dec. 21, 1973 Germany............................ 2363679

[52] U.S. Cl................................ 423/469; 423/481
[51] Int. Cl.² ...................... C01B 17/45; C01B 7/08
[58] Field of Search............................ 423/469, 481

[56] References Cited
UNITED STATES PATENTS
2,897,055  7/1959  Muetterties et al................. 423/469
2,992,073  7/1961  Tullock................................ 423/469

OTHER PUBLICATIONS
J. Chem. Soc., 1955, p. 3147.
C & EN Review and Prereviews, The Chemical World 1959/1960, Jan. 4., 1960.
J.S.C.I., 67, Feb. 1948, pp. 48 and 49.

Primary Examiner—Edward Stern
Attorney, Agent, or Firm—Burgess, Dinklage & Sprung

[57] ABSTRACT

The instant invention relates to a process for the production of sulfur tetrafluoride wherein sulfur tetrachloride or mixtures consisting of sulfur dichloride and chlorine are reacted with hydrogen fluoride in the presence of a carbon tetrahalide and subsequently the sulfur tetrafluoride is separated.

6 Claims, No Drawings

PROCESS FOR THE PRODUCTION OF SULFUR TETRAFLUORIDE

This invention relates to a new and useful method of preparing sulfur tetrafluoride, $SF_4$. Sulfur tetrafluoride is an extremely useful fluorinating agent, which is particularly suited for the fluorination of oxygen-, sulfur- and nitrogen-containing groups bonded to non-metal or metal atoms (cf. W. C. Smith, Angew. Chem. 74, 742 [1962]).

Hitherto sulfur tetrafluoride has been prepared by reacting sulfur chlorides with metal fluorides, preferably sodium fluoride at elevated temperatures in acetonitrile as a solvent. This method, however, is highly complicated since it needs a rather long reaction period. In addition, the reaction product obtained according to the known method contains other volatile and non-volatile by-products the separation of which is rather difficult so that purification involves considerable expenditure. A further disadvantage of the known method is that yields of only about 50 percent can be obtained.

The reaction of elementary fluorine and sulfur has recently been described (D. Naumann and D. K. Pachma, Z. anorg. allg. Chem. 401, 53 [1973]), but this method also yields unsatisfactory results, since the reaction is far too complicated and a pure product is never obtained.

One of the objects of the present invention is a method of preparing sulfur tetrafluoride, $SF_4$, in an economic and fairly simple way. Surprisingly, it has been found that sulfur tetrachloride and a mixture of carbon tetrahalide and hydrogen fluoride react to give a high yield of $SF_4$. The reaction course may be represented, for example, by the following equation:

$$SCl_4 + CCl_4 + 5HF \xrightarrow{-4HCl, -HF} SF_4 + CCl_4.$$

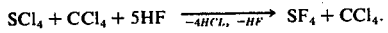

Instead of sulfur tetrachloride a mixture consisting of sulfur dichloride and chlorine may also be used as starting materials.

The reaction is preferably carried out in aprotic solvents such as dichloromethane, chloroform, dichloroethane, acetonitrile, tetrahydrofuran or n-hexane. The reaction temperature should be between −80°C and +40°C, preferably between −70°C and +20°C, and more preferably between −60°C and 0°C.

The reaction components should be used in stoichiometric amounts; however, if the HF-component is present in an excess of up to about 5–50 % by weight, this would not be a disadvantage.

The reaction is carried out in conventional reaction vessels with the necessary devices such as stirrers, cooling devices etc. It is, however, important that moisture is excluded. It is therefore preferable to carry out the process in an atmosphere of thoroughly dried inert gases, e.g. nitrogen or argon.

After the reaction has finished the reaction product is separated from the solvent, preferably by distillation.

In a preferred embodiment of the instant invention a base, preferably a tertiary nitrogen base such as triethylamine or pyridine, is added to the reaction mixture after the reaction is finished. This step is performed in order to bind the hydrogen chloride formed during the reaction and to bind hydrogen fluoride which may be present in excess. The base is added in such an amount sufficient to bind the above-mentioned substances.

The resulting $SF_4$ which may be obtained in a pure form and without any by-products is separated from the reaction mixture, preferably by distillation, and collected in a cooling trap.

Such $SF_4$ may be used as a selective fluorinating agent which replaces for instance carbonyl oxygen in aldehyde, ketones or carboxylic acids.

The following examples are given to illustrate the method according to the invention and are not intended to unduly limit the general scope of the invention as set out in the appended claims.

EXAMPLE 1

Chlorine, sufficient for the chlorination of 0.1 mole $SCl_2$, is condensed at −78°C and $SCl_2$ subsequently added. As the solvent 20 ml of dichloromethane are used. After stirring the mixture, 0.1 mole $CCl_4$ and subsequently 0.45 mole of precondensed HF are added dropwise. The temperature is then elevated to about −50°C and the mixture is stirred for a further 3.5 hours. In order to bind the excess HF and the hydrogen chloride formed during the reaction, triethylamine is added in a stoichiometric amount.

The desired reaction product $SF_4$ is collected in a cooling trap at temperatures slightly above the boiling point of $SF_4$ (b.p. −40°C).

The yield was 92 percent of the theory.

EXAMPLE 2

In a three-necked flask (quartz) with an inlet for gas, a stirrer and a dropping funnel 51.5 g of freshly distilled $SCl_2$ (0.5 moles) are chlorinated by the addition of 0.5 moles of chlorine (35.5 g) at −70°C. After 10 minutes 50 g of anhydrous liquid hydrogen fluoride (2.5 moles) are added, thereafter followed by the addition of 76.5 g (0.5 moles) of $CCl_4$ and 150 ml n-hexane to the reaction mixture. The reaction mixture is stirred for 6 hours and then 197.7 g (2.5 moles) of pyridine are slowly added dropwise to the white dispersion at about −50°C (in an atmosphere of argon).

The mixture is thereafter heated to room temperature and the volatile products condensed in a cooling trap (cooled to about −195°C). The resulting $SF_4$ is condensed by fractionation 3 times and identified by NMR-spectroscopy. The yield was 43.2 g. (80 percent of the calculated amount). g

What is claimed is:

1. A process for the production of sulfur tetrafluoride comprising reacting sulfur tetrachloride or a mixture consisting of sulfur dichloride and chlorine with hydrogen fluoride in liquid phase at temperatures between −80°C and +40°C in the presence of carbon tetrachloride and subsequently separating the sulfur tetrafluoride.

2. A process according to claim 1 wherein the reaction is carried out in an aprotic solvent.

3. A process according to claim 2 wherein the aprotic solvent is a member selected from the group consisting of dichloromethane, chloroform, dichloroethane, acetonitrile, tetrahydrofurane or n-hexane.

4. A process according to claim 1 wherein before separating the sulfur tetrafluoride a base is added to the reaction mixture to bind the hydrogen chloride formed during the reaction as well as any excess hydrogen fluoride.

5. A process according to claim 4 wherein the base is a tertiary amine base.

6. A process according to claim 4, wherein the tertiary amine base is triethylamine or pyridine.

* * * * *